United States Patent [19]
Belser et al.

[11] Patent Number: 5,966,264
[45] Date of Patent: Oct. 12, 1999

[54] TWO FREQUENCY SERVO PES PATTERN

[75] Inventors: Karl Arnold Belser; Wayne Leung Cheung, both of San Jose, Calif.

[73] Assignee: International Business Machines Cororation, Armonk, N.Y.

[21] Appl. No.: 08/908,743

[22] Filed: Aug. 7, 1997

[51] Int. Cl.$^6$ ............................................. G11B 5/596
[52] U.S. Cl. ........................................ 360/77.08; 360/48
[58] Field of Search ............................ 360/77.08, 77.05, 360/77.02, 48

[56] References Cited

U.S. PATENT DOCUMENTS

| | | | |
|---|---|---|---|
| 3,404,392 | 10/1968 | Sordello | 340/174.1 |
| 3,449,734 | 6/1969 | Frey et al. | 340/174.1 |
| 3,474,432 | 10/1969 | Sevilla | 340/174.1 |
| 3,840,893 | 10/1974 | Jacoby et al. | 360/77 |
| 3,864,740 | 2/1975 | Sordello et al. | 360/77 |
| 3,956,769 | 5/1976 | Beecroft et al. | 360/77 |
| 4,048,660 | 9/1977 | Dennison et al. | 360/77 |
| 4,084,201 | 4/1978 | Hack et al. | 360/135 |
| 4,188,646 | 2/1980 | Sordello et al. | 360/77 |
| 4,209,810 | 6/1980 | Ragle et al. | 360/77 |
| 4,348,703 | 9/1982 | Janosi | 360/77 |
| 4,414,589 | 11/1983 | Oliver et al. | 360/77 |
| 4,488,188 | 12/1984 | Hansen et al. | 360/77 |
| 4,549,232 | 10/1985 | Axmear et al. | 360/77 |
| 4,551,777 | 11/1985 | Saito et al. | 360/77 |
| 4,616,275 | 10/1986 | Peeters | 360/77 |
| 4,843,493 | 6/1989 | Furuhata et al. | 360/77.15 |
| 4,875,114 | 10/1989 | Moteki | 360/77.08 |
| 4,975,791 | 12/1990 | Eggebeen | 360/77.01 |
| 4,996,609 | 2/1991 | Joannou | 360/57 |
| 5,121,375 | 6/1992 | Kuribayashi | 369/44.37 |
| 5,170,299 | 12/1992 | Moon | 360/77.08 |
| 5,216,646 | 6/1993 | Imanaka et al. | 369/44.26 |
| 5,258,879 | 11/1993 | Shimotashiro et al. | 360/77.14 |
| 5,309,299 | 5/1994 | Crossland et al. | 360/77.01 |
| 5,408,373 | 4/1995 | Bajorek et al. | 360/104 |
| 5,442,498 | 8/1995 | Cheung et al. | 360/77.08 |
| 5,448,430 | 9/1995 | Bailey et al. | 360/77.12 |
| 5,453,887 | 9/1995 | Negishi et al. | 360/77.1 |
| 5,453,888 | 9/1995 | Tsunoda et al. | 360/77.08 |
| 5,793,554 | 8/1998 | Chainer et al. | 360/75 |

OTHER PUBLICATIONS

Cramer et al., "Digital Information Track and Read–Write Appts", Jun. 22, 1995, Abstract for WO 95–16985.

Nobumasa Nishiyama, "Magnetic Disk Device and Method for Forming Servo Data", Aug. 13, 1993, Abstract from JP 5–205419.

Osamu Miyazaki, "Magnetic Disk Device", Feb. 13, 1992, Abstract from JP 4–42476.

Mizukami Makoto et al., "Method and Device for Writing Servo Track of Magnetic Disk Device", Oct. 11, 1989, Abstract from JP 01–253814.

Tsuguo Sato, "Discoid Magnetic Recording Medium", Aug. 2, 1989, Abstract from JP 1–37774.

Nemoto Shoji et al., "Tracking Controller", Sep. 29, 1988, Abstract from JP 63–234440.

(List continued on next page.)

*Primary Examiner*—Aristotelis M. Psitos
*Assistant Examiner*—Dan I. Davidson
*Attorney, Agent, or Firm*—Gray Cary Ware Freidenrich

[57] ABSTRACT

Servo pattern bursts are recorded with two frequencies that are detected using heterodyne detection with oscillators at the same frequency as the respective recorded frequencies. The two frequencies are selected to be orthogonal so the sensed servo pattern of one frequency is zero when detected with the detecting circuitry of the other frequency. The servo pattern bursts of the two frequencies are placed close together on the disk so they are sensed simultaneously so that, with orthogonality processing, a PES signal from a three phase pattern is sufficient to provide a robust linear signal, thereby eliminating one of the bursts from a quadrature pattern and reducing the disk surface area needed in each track for the servo pattern by 25% or more.

21 Claims, 7 Drawing Sheets

OTHER PUBLICATIONS

Seiichirou Tamamushi, "Measuring Device of Off–Track Quantity of Magnetic Disc Device", Jun. 30, 1984, Abstract from JP 59–113572.

Terada Akimichi, "Automatic Scanner for Magnetic Recorder and Reproducer", Dec. 15, 1983, Abstract from JP 58–215721.

"Tracking Error Detection System Uses Two Different Frequency Signals to Compare Regnerated Level of Beat Signal and Standard Voltage", Aug. 2, 1982, from JP 57–123525.

Seo Yuzo, "Data Recording Medium and Data Recording/Reproducing Apparatus", Mar. 10, 1995, Abstract from JP 07–0656518.

Kiyoshi Funa, "Magnetic Disk Device", Feb. 26, 1986, Abstract from JP 61–39986.

Yamano Minoru, "Tracking Servo System", May 8, 1986, Abstract from JP 61–090318.

Toru Okada, "Disk Device", Feb. 12, 1988, Abstract from JP 63–32772.

Katakura Toru, "Recording and Reproducing Device for Discoid Recording Medium", May 31, 1988, Abstract from JP 63–127416.

"Combined Data/Servo Track Magnetoresistive Sensor for Magnetic Tape Heads", *Research Disclosure*, Aug. 1991, No. 328.

M. D. Levenson, "Reflectivity–Coded Phase–Sensing Servo for Optical Memories", Jul. 1989, *IBM Technical Disclosure Bulletin*, vol. 32, No. 2, pp. 74–76.

C. H. Bajorek et al., "Large Surface Air Bearing for a Flexible Disc File", Apr. 1976, *IBM Technical Disclosure Bulletin*, vol. 18, No. 11, pp. 3859–3860.

M. Barlow et al., "Thin Film Magnetic Head Assembly", Sep. 1981, *IBM Technical Disclosure Bulletin*, vol. 24, No. 4, pp. 1912–1913.

D. M. Jones, "Parallel Servo–Track Write and Read Verification with Side–by–Side Inductive Elements", Jan. 1984, *IBM Technical Disclosure Bulletin*, vol. 26, No. 8, pp. 4243–4244.

G. N. Tsilibes, "Transducer Position Sensor", Oct. 1961, *IBM Technical Disclosure Bulletin*, vol. 4, No. 5, pp. 24–25.

F. E. Mueller, "Dual Frequency Servo–Positioning System Employing Saturated Recording", Mar. 1978, *IBM Technical Disclosure Bulletin*, vol. 20, No. 10, pp. 4110–4111.

T. D. Howell, "Pattern for Buried Servo", Jun. 1980, *IBM Technical Disclosure Bulletin*, vol. 23, No. 1, pp. 304–305.

C. Handeon et al., "Improvement in the Position Error Signal Detector Channel for a 'Buried Servo' Recording System", Aug. 1980, *IBM Technical Disclosure Bulletin*, vol. 23, No. 3, pp. 1203–1210.

M. A. Weed, "Dedicated Servo Pattern and Low–Cost Demodulator", Jul. 1987, *IBM Technical Disclosure Bulletin*, vol. 30, No. 2, pp. 657–663.

M. Padalino et al., "Track–Following Servosystem", Mar. 1969, *IBM Technical Disclousure Bulletin*, vol. 11, No. 10, pp. 1303–1304.

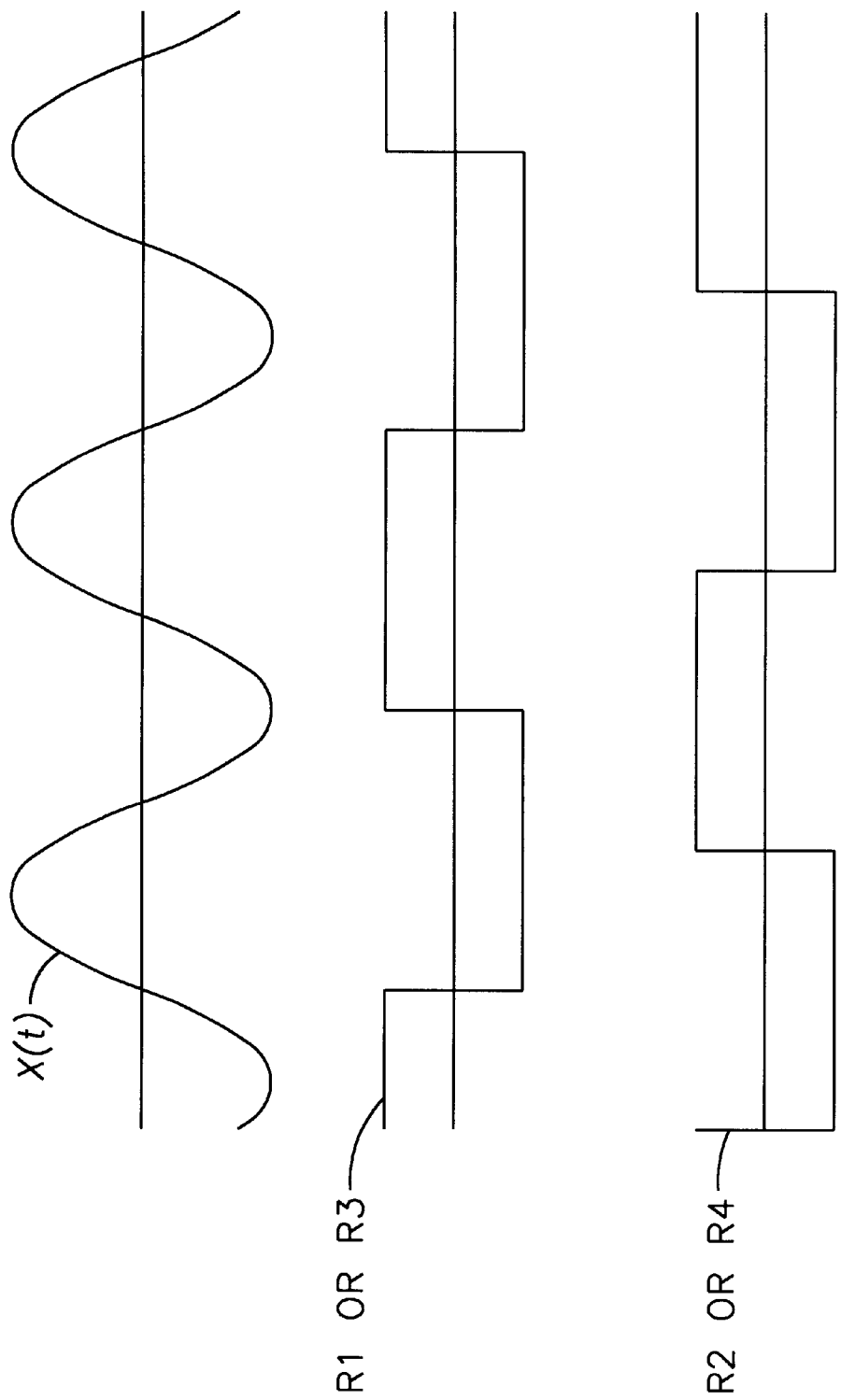

TWO FREQUENCY SERVO PES PATTERN

BACKGROUND OF THE INVENTION

1. Field of the Invention

This invention relates generally to magnetic head servo control systems and, more particularly, to disk drive position control systems that determine the location of a head relative to disk tracks.

2. Description of the Related Art

In a conventional computer data storage system having a rotating storage medium, such as a magnetic or magneto-optical disk system, data is stored in a series of concentric or spiral tracks across the surface of the disk. A magnetic disk, for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface in close proximity to the disk. That is, a transducer or read/write head is provided to produce and detect variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo systems.

A servo control system generally maintains a read/write head in a position centered over a track by reading servo information recorded onto the disk surface. The servo information comprises a position-encoded servo pattern of high frequency magnetic flux transitions, generally flux reversals, that are pre-recorded in disk servo tracks. The flux transitions are recorded as periodic servo pattern bursts formed as parallel radial stripes in the servo tracks. When the read/write head passes over the servo pattern flux transitions, the head generates an analog signal whose repeating cyclic variations can be demodulated and decoded to indicate the position of the head over the disk. The demodulated servo signal is referred to as a position error sensing (PES) signal.

In a sector servo method for providing servo track information to a disk servo control system, each disk surface of the disk drive includes servo track information and binary data recorded in concentric or spiral tracks. The tracks on a sector servo disk surface are divided into radial sectors having a short servo track information area followed by a customer data area. The servo track information area typically includes a sector marker, track identification data, and a servo burst pattern. The sector marker indicates to the data read/write head that servo information immediately follows in the track. The servo read head can be the same head used for reading data or can be a separate, dedicated servo head. The PES signal is used to generate a corrective input signal that is applied to the read/write head positioning servo.

FIG. 1 is a representation of a conventional quad-burst servo pattern in which magnetic transitions are recorded in bursts labeled as A, B, C, and D. The servo tracks are indicated by the track numbers along the left side of the drawing figure. The tracks extend across the page from left to right. The portion of the disk 22 shown in FIG. 1 extends approximately from servo track N−1.0 toward the inner diameter of the disk to servo track N+2.5 toward the outer diameter. Those skilled in the art will appreciate that position information is decoded by demodulating the signal generated by the head passing over the PES burst patterns to form a signal P based on:

$$P=A-B$$

and to form a quadrature signal Q based on:

$$Q=C-D$$

The signals P and Q are quadrature signals because they are cyclic and are out of phase by 90 degrees (one-quarter signal phase). The magnetic transitions that comprise the servo pattern are represented in FIG. 1 by vertical bars. The letter within each group of bars represents the servo burst recorded therein. One burst is distinguished from another by relative position in a track and relative position to the other bursts. Thus, for a servo head that can detect magnetic transitions from more than one track at a time, the signal P should be zero when the head is tracking exactly along the centerline of servo track N in FIG. 1, because when tracking along the centerline the head will receive equal amounts of magnetic field from the A and B servo pattern bursts. A similar situation exists for servo tracks N+1, N+2, and so forth. For servo track N+0.5, the signal Q should be zero when the head is tracking exactly along the N+0.5 track centerline because the head will receive equal amounts of field from the C and D servo pattern bursts. The signal Q should be zero also for servo tracks N+1.5, N+2.5, and so forth when tracking along their respective centerlines.

Conventionally, it is typical to use the same write element for recording the servo bursts and for recording customer data when the disk is thereafter used, and to use the same read element for reading servo bursts and for reading customer data recorded in the data tracks. The servo bursts of FIG. 1 are recorded in a trimming process, in which a portion of each servo burst, recorded so it extends into an adjacent track width on one servo writer step, is overwritten (erased) in the next servo writer step.

Assuming that "e" is an inaccuracy or error produced by each servo write step, and P and Q defined as above are produced by reading from adjacent servo bursts formed in different servo write steps with trimming, the P or Q inaccuracy can be approximated statistically as:

$$a=e*sqrt(2.0),$$

where e is the 3-sigma servo writer position error (tracking error) caused by one servo writer step.

FIG. 2 is an equivalent representation of the A, B, C, and D servo bursts of FIG. 1 arranged so that the servo tracks run vertically up and down the drawing sheet, the disk inside diameter (ID) is to the right side of the drawing and the disk outside diameter (OD) is to the left side of the drawing. Thus, the read/write head moves relative to the servo pattern from the top of the FIG. 2 illustration to the bottom of the FIG. 2 illustration. FIG. 3 is a graph of the P and Q values associated with the corresponding read/write head position relative to the FIG. 2 servo pattern. For example, if the read/write head is tracking exactly between the A, B bursts and through the mid-point of either the C or D bursts shown in FIG. 2, then the value of the P component of the PES signal should be zero because:

i $P=(A-B)$, and the value of the Q component of the PES signal should be at a maximum, because:

$Q=(C-D)$.

This should be apparent from review of FIG. 2 and FIG. 3. Similarly, if the read/write head is tracking exactly between the C, D bursts and through the mid-point of either the A or B bursts, then the value of the Q component should be zero and the value of the P component should be at a maximum.

Thus, the P and Q signals are cyclic, having peaks and valleys, as the read/write head is moved laterally across the disk. This is how read/write head position can be determined from the PES signal. Unfortunately, due to readback head characteristics, the peaks and valleys of the corresponding PES signal will not necessarily provide a linear function with respect to the head position; rather, there are regions of nonlinear response. To ensure a more linear combined PES signal, it is typical to create a stitched PES signal by selecting between either the P signal or the Q signal, depending on which signal is in a linear operating range.

FIG. 4 shows the stitched PES signal formed by selecting between the P and Q values according to the following:

stitched $PES=P*sgn(Q)$ if $|Q|>|P|$;

else=$Q*sgn(P)$, where sgn(x) indicates the sign or polarity (positive or negative) of the value x. In this way, the switched PES signal comprises a signal formed by selecting the magnitude of either the P or the Q signal and then adjusting its polarity, depending on which is operating in its linear range. It should be apparent that the switched PES signal represents the linear portions of the respective P and Q signals shown in FIG. 3. The resulting stitched PES signal indicates the direction in which the read/write head should be moved to maintain the head centered between the corresponding track centers, either A and C or B and D.

There is a demand for ever-increasing amounts of storage capacity for customer data. One constraint on the amount of disk surface area for storing customer data is the amount of space required by the PES servo pattern itself, as shown in FIGS. 1 and 2. It should be appreciated that every bit of disk surface space freed from servo pattern usage can be shifted to customer data. It also should be appreciated that reducing the amount of error caused by the servo writer should permit high track density disk storage designs.

From the discussion above, it should be apparent that there is a need for a disk drive system with a servo pattern that increases the amount of disk surface area available for storage of customer data and reduces the time needed to produce the pattern. The present invention fulfills this need.

SUMMARY OF THE INVENTION

The present invention utilizes a servo pattern having bursts that are constructed from two frequencies that are orthogonal (out of phase by 90°) and are arranged so that both frequencies are simultaneously detected to form one of three phase signals and provide a position error sensing (PES) signal. The three-phase PES signal is sufficient to provide substantially the same information provided by a conventional quad burst servo pattern and therefore only three types of servo bursts A, B, and C are needed for the underlying tri-burst servo pattern, eliminating what would otherwise be the D pattern bursts from a quadrature servo pattern, thereby reducing by 25% the disk surface area needed for the tri-burst servo pattern. The tri-burst servo pattern bursts are arranged more closely together as compared with typical quadrature servo patterns and can be recorded on the disk using fewer servo writer steps.

More particularly, the bursts of the tri-burst servo pattern are recorded with two frequencies that are detected using conventional heterodyne detection with oscillators at the same frequency as the respective recorded frequencies. The two frequencies are selected to be orthogonal so the sensed servo pattern burst of one frequency is zero when detected with the detecting circuitry of the other frequency. Using orthogonality, the readback signal can still be separated for the two frequencies if the servo pattern bursts are placed close together on the disk so they are sensed simultaneously. Because of the orthogonality and simultaneous detection, and using PES stitching techniques, the three-phase PES signal is sufficient to provide a robust linear signal, so that one of the servo pattern bursts (such as the D bursts in a quadrature pattern) can be eliminated from the disk, thereby reducing the disk surface area needed in each track by 25%.

Other features and advantages of the present invention should be apparent from the following description of the preferred embodiment, which illustrates, by way of example, the principles of the invention.

BRIEFS DESCRIPTION OF THE DRAWINGS

FIG. 15 is a representation of the signal conversion that takes place during the data channel processing illustrated in FIG. 14.

DESCRIPTION OF THE PREFERRED EMBODIMENTS

Two different embodiments of a two-frequency, tri-burst servo pattern in accordance with the invention will be described. The description of each embodiment will include explanation of the pattern demodulation and the pattern recording.

THE TWO-FREQUENCY, TRI-BURST SERVO PATTERN OF THE FIRST EMBODIMENT

Figure 1:
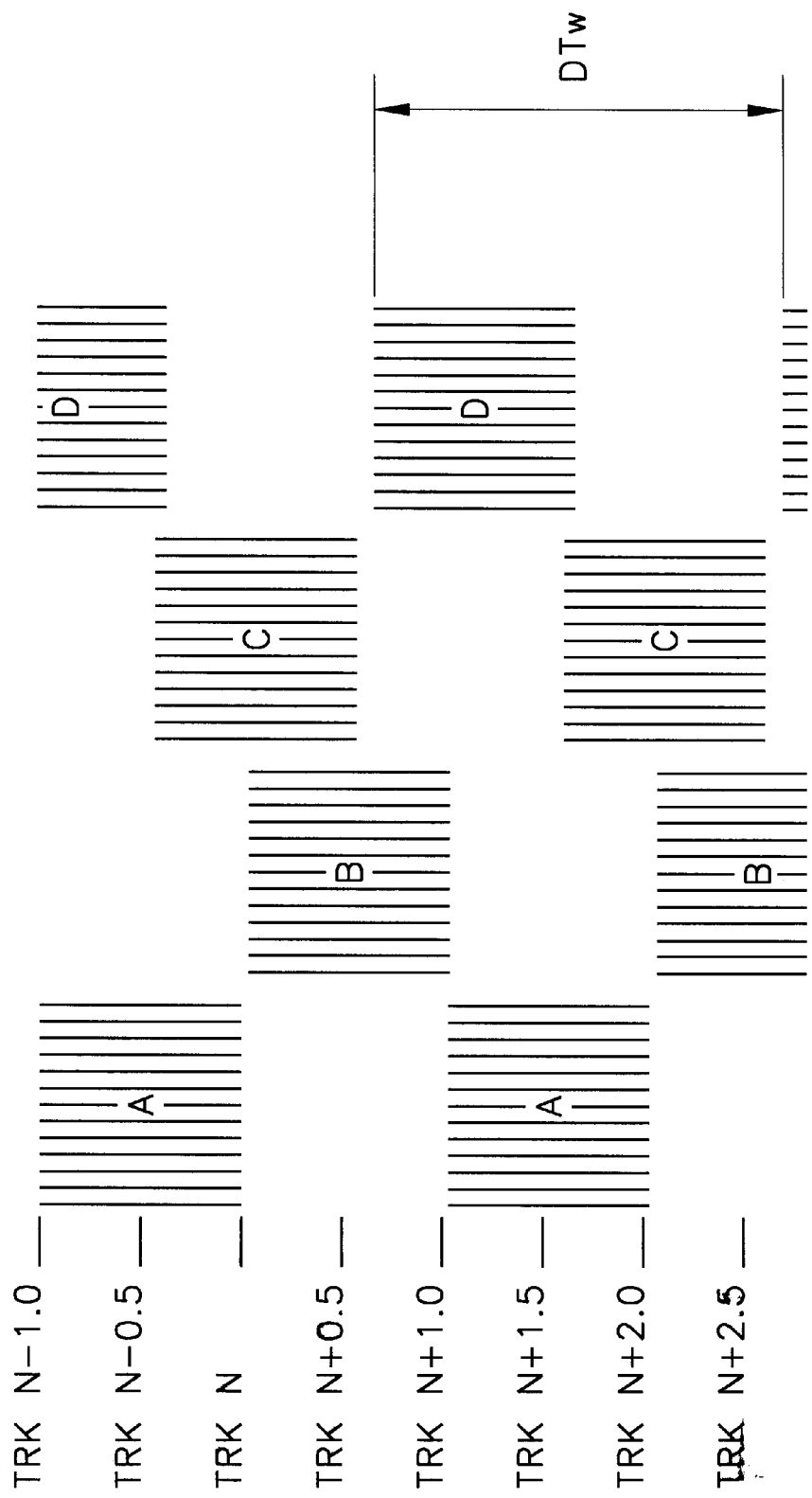
FIG. 1 is a representation of a conventional quad-burst servo pattern such as recorded into a sector servo disk.
Figure 2:
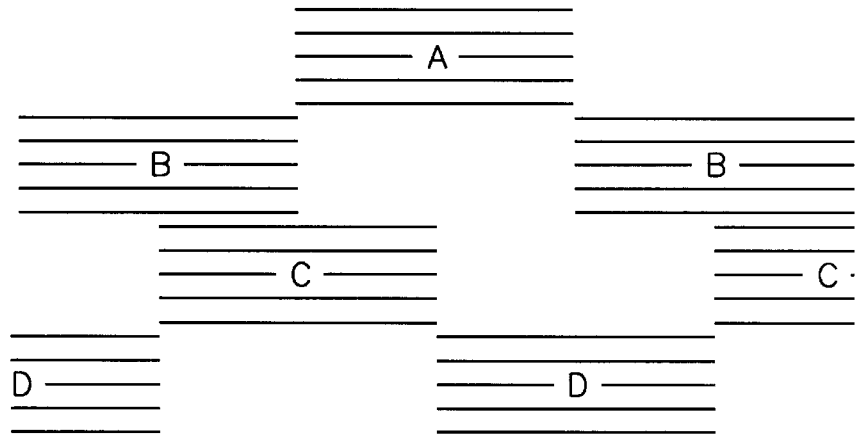
FIG. 2 is a representation of a conventional quad-burst servo pattern such as illustrated in FIG. 1, in a vertical orientation.
Figure 3:
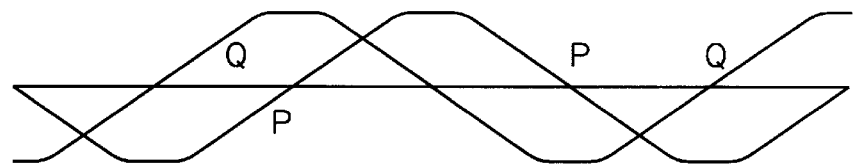
FIG. 3 is a representation of the P signal and Q signal portions of the PES signal produced by the servo pattern illustrated in FIG. 3.
Figure 4:
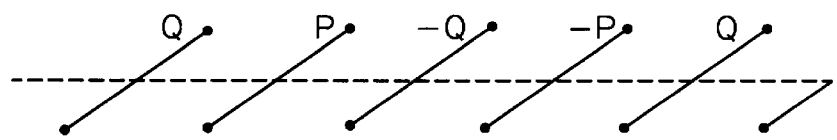
FIG. 4 is a representation of the stitched PES signal produced from the P and Q signals shown in FIG. 3.
Figure 5:
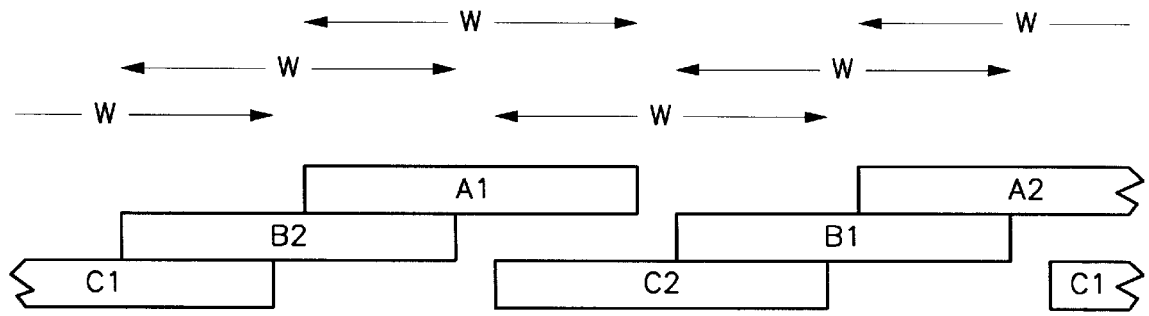
FIG. 5 is a representation of a two-frequency, three-phase, untrimmed servo pattern that has been recorded into a sector servo disk in accordance with the present invention, using two servo writer steps per data track.

FIG. 5 is a representation of a two-frequency, tri-burst servo pattern recorded in tracks on a magnetic storage disk in accordance with the invention. As described more fully below, the FIG. 5 representation shows the servo write steps "W" that are used to record the servo pattern and, immediately below the write steps, shows a representation of the servo pattern bursts in a servo field area of the disk surface. The A1, B1, and C1 servo bursts comprise magnetic transitions recorded at a first frequency f1 and the A2, B2, and C2 servo bursts comprise magnetic transitions recorded at a second frequency f2, different from f1. The two-frequency, tri-burst servo pattern is arranged so the servo tracks run vertically up and down the FIG. 5 drawing in the head transducing, circumferential direction. The servo field, in which the servo pattern is recorded, is generally bounded by the top edge of the A1, A2 bursts and the bottom edge of the C1, C2 bursts. The disk inside diameter (ID) is to the right side of the drawing and the disk outside diameter (OD) is to the left side of the driving.

Thus, the A1 and A2 servo bursts are radially aligned on the surface of the storage disk, being spaced apart radially from each other. The B1 and B2 servo bursts also are arranged in radial alignment with each other, and the C1 and C2 servo bursts are arranged in radial alignment. A representation of the read element width R is shown below the servo pattern bursts.

In accordance with the invention, servo pattern bursts are placed sufficiently close together on the disk so they are sensed simultaneously, and a reduced number of servo pattern bursts is utilized. Thus, the overall servo pattern takes up less disk surface area than is conventional. For example, in FIG. 5., the disk surface area between the servo bursts, the blank area, is preferably substantially less than one-half the total servo field area. The two frequencies f1, f2 are selected to be orthogonal so the sensed servo pattern of one frequency is zero when detected with the detecting circuitry for the other frequency. Because of the orthogonality and simultaneous detection, and through using PES signal stitching techniques, one of the quadrature servo pattern bursts that otherwise would be present (such as the D bursts) can be eliminated from the pattern, thereby reducing the disk surface area needed for the servo pattern by 25%.

The circumferential length of the two-frequency, tri-burst servo pattern of FIG. 5, that is, the pattern vertical length in the transducing direction, is preferably 25% shorter than conventional quad burst servo patterns because the pattern comprises a set of A, B, C servo bursts, rather than the A, B, C, and D servo bursts that would comprise a conventional quad burst arrangement. In this way, the FIG. 5 servo pattern can be recorded on a disk using fewer servo bursts, which take up less disk space, and which can be recorded in less time.

DEMODULATION OF THE FIRST TWO-FREQUENCY, TRI-BURST SERVO PATTERN OF THE INVENTION

Figure 6:
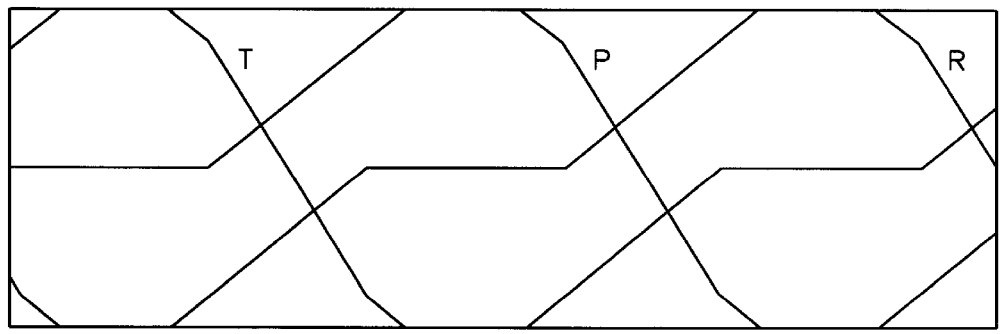
FIG. 6 is a representation of the R, T, and P components of the PES signal produced by the servo pattern illustrated in FIG. 5.
Figure 7:
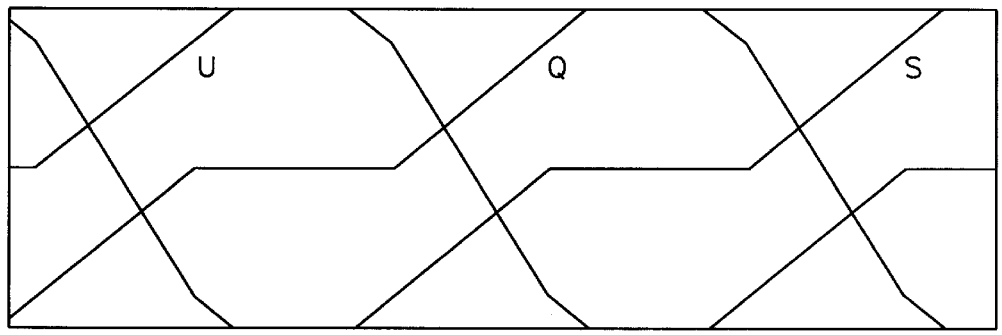
FIG. 7 is a representation of the Q, S, and U components of the PES signal produced by the servo pattern illustrated in FIG. 5.

FIG. 6 and FIG. 7 are graphs of the corresponding PES signals produced by a read/write head for a given track position as it transduces the FIG. 5 servo pattern. It should be apparent that servo track centers are defined by two bursts of the same frequency. FIG. 6 shows the signal obtained from the f1 bursts. Similarly, FIG. 7 represents the f2 burst signal. The signals represented by the FIG. 6 and FIG. 7 graphs are combined to produce a position error sensing (PES) signal in a process called demodulation. The PES signal components of FIG. 6 and FIG. 7 are given by the following equations:

$$P = A1 - B1$$

$$R = B1 - C1$$

$$T = C1 - A1$$

$$S = A2 - B2$$

$$Q = C2 - A2$$

$$U = B2 - C2$$

These demodulation relationships should be apparent from examination of FIG. 6 and FIG. 7. For example, if the read/write head is tracking exactly between the A1 servo burst and the B1 servo burst, then the P signal component should be at zero, because at this location the amount of A1 burst and B1 burst detected and transduced by the read/write head will be equal, so that $P = A1 - B1 = 0$. If the read/write head is moved toward the A1 burst, then the P signal component becomes more positive, because more of the A1 burst is sensed. If the read/write head is moved toward the B1 burst, then the P signal component becomes more negative, because more of the B1 burst is sensed. The P signal component reaches a peak value when the read head is centered over the A1 burst, and decreases when the read/write head is moved to the left, away from the A1 burst, as less of the A1 burst is sensed. The P signal component levels off at zero when the A1 burst and the B1 burst contributions cancel each other out, then becomes negative as the head moves closer to the B1 burst.

The other PES signal components can be analyzed in the same way. Thus, the PES signal component U is zero if the read/write head is tracking exactly between the B2 burst and the C2 burst, because at this location the amount of B2 burst and the amount of C2 burst sensed by the read/write head are equal, and $U = B2 - C2 = 0$. If the read/write head is moved toward the B2 burst, then the U signal component becomes more positive, because more of the B2 burst is sensed. If the read/write head is moved toward the C2 burst, then the U signal component becomes more negative, because more of the C2 burst is sensed. The rest of the analysis is similar to that of the P signal component described above.

In the preferred embodiment, the PES signal component values are normalized through division of the burst amplitude difference by the corresponding burst amplitude sum for the same frequency. This normalization is to compensate for the typically different amplitude frequency response produced by the signal demodulation circuitry for the two different frequencies of the servo pattern bursts. Thus, the PES signal components are specified by the amplitude burst difference divided by the burst amplitude sums, as given by the following Table 1:

TABLE 1

| Burst amplitude difference | Burst amplitude sum (normalization divisor) |
|---|---|
| A1-B1 | A1 + B1 |
| B1-C1 | B1 + C1 |
| C1-A1 | C1 + A1 |
| A2-B2 | A2 + B2 |
| C2-A2 | C2 + A2 |
| B2-C2 | B2 + C2 |

Thus, the normalized PES signal component having the difference term (A1–B1) is given by the quotient (A1–B1)/(A1+B1); the normnalized PES signal component having the (B1–C1) component is given by the quotient (B1–C1)/(B1+C1); and so forth.

Figure 8:
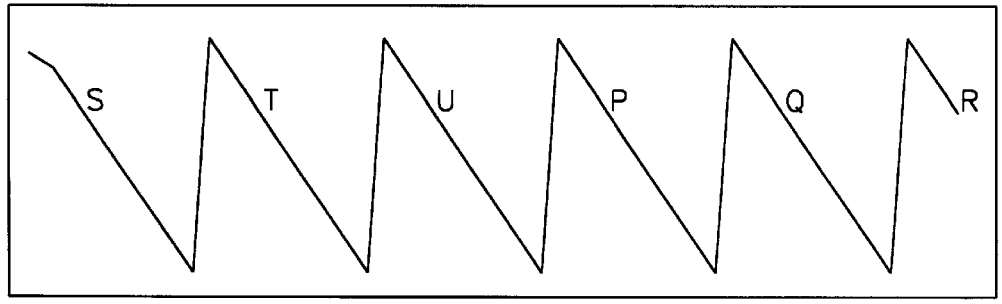
FIG. 8 is a representation of the stitched PES signal produced from the signal components shown in FIG. 6 and 7.

FIG. 8 is a graph of the stitched PES signal produced from combination (stitching) of the P, R, T, S, Q, and U signal components. Stitching of the PES signal components provides a stitched PES signal that is more linear in terms of head movement-readback signal response than a corresponding unstitched PES signal. In accordance with the invention, portions of the FIG. 6 and FIG. 7 graphs are combined to provide the FIG. 8 stitched PES signal according to the following relationships specified in Table 2:

TABLE 2

PES = P if $Q \geq P$ and $Q \geq R$;
R if $S \geq R$ and $S \geq T$;
T if $U \geq T$ and $U \geq P$;
Q if $R \geq Q$ and $R \geq S$;
S if $T \geq S$ and $T \geq U$;
U if $P \geq U$ and Q.

The FIG. 8 stitched PES provides a more linear response to disk head movement from track to track. The FIG. 8 stitched PES provides a signal that quickly and accurately indicates the direction in which the read/write head must be moved to maintain position relatively centered above a track.

WRITING THE FIRST TWO-FREQUFNCY, TRI-BURST SERVO PATTERN OF THE FIRST EMBODIMENT

In addition to providing a PES servo pattern in 25% less disk space, the servo pattern constructed in accordance with the present invention can be recorded on a disk with fewer servo writer steps, and without trimming. This makes disk production more efficient.

Referring back to FIG. 5. the width "W" is the write head width, and each "W" line represents a servo writer step in recording the servo pattern. The write head width is shown as slightly less than two servo writer steps wide and approximately equal in width to a single servo pattern burst. It should be apparent that the FIG. 5 servo pattern bursts A1, B1, C1, A2, B2, C2 require two servo writer steps between track centers.

For example, at a first write step, a read/write head records the B2 servo burst in the vertical transducing direction. The read/write head is moved radially one-half track to the left in FIG. 5 and, at the next rotation of the disk, the C1 servo burst is recorded. Referring now to the C1 burst at the right edge of FIG. 5, on the next disk rotation the read/write head is moved radially one-half track to the left and the A2 servo burst is recorded. Next, at approximately one-half servo track offset from the A2 servo burst, the B1 servo burst is recorded. The read/write head is moved another half-track to the left and on the next pass the C2 servo burst is recorded, then the A1 servo burst is recorded one-half track further, and the process repeats. Thus, from track center to track center, two servo writer steps are required.

It should be noted that the preferred embodiment provides seamless servo pattern recording because the write head width, as shown above, is equal in width to the servo pattern bursts. This improves the linearity of the readback response and makes servo writing more efficient.

THE TWO-FREQUENCY, TRI-BURST SERVO PATTERN OF THE SECOND EMBODIMENT

Figure 9:
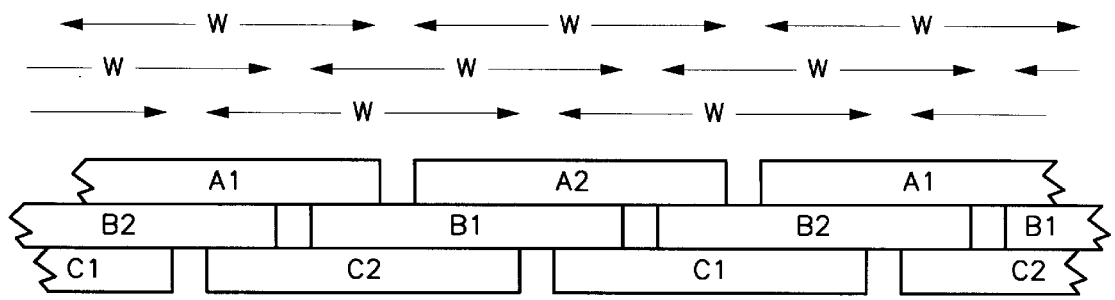
FIG. 9 is a representation of a two-frequency, three-phase, trimmed servo pattern that has been recorded into a sector servo disk in accordance with the present invention, using three servo writer steps per data track.

FIG. 9 is a representation of a two-frequency, tri-burst servo pattern recorded in tracks on a magnetic storage disk in accordance with a second embodiment of the invention. The FIG. 9 representation shows the servo write steps W that are used to record the pattern and, immediately below in FIG. 9, shows a representation of the servo pattern bursts in a servo field area of the disk surface. Again, the A1, B1, and C1 servo bursts comprise magnetic transitions recorded at a first frequency f1 and the A2, B2, and C2 servo bursts comprise magnetic transitions recorded at a second frequency f2, different from the first frequency f1. In FIG. 9, the two-frequency, tri-burst servo pattern is arranged so the servo tracks run vertically up and down the drawing sheet in the head transducing, circumferential direction. The servo field area is generally bounded by the top edge of the A1, A2 servo bursts and the bottom edge of the C1, C2 servo bursts. The disk inside diameter (ID) is to the right side of the drawing and the disk outside diameter (OD) is to the left side of the drawing.

As with the prior embodiment, the A1 and A2 servo bursts are radially aligned on the surface of the storage disk, being spaced apart radially from each other. The B1 and B2 servo bursts also are arranged in radial alignment with each other, displaced circumferentially from the A and C bursts. The C1 and C2 servo bursts are arranged in radial alignment and are displaced circumferentially from the A and B servo bursts. A representation of the read element width R is shown below the servo pattern bursts.

In a similar fashion with the first embodiment, the servo pattern bursts are placed close together in the FIG. 9 embodiment, so that the overall pattern takes up less disk surface area than is conventional, and the servo pattern bursts are placed sufficiently close together on the disk so they are sensed simultaneously. Again, the two frequencies f1, f2 are selected to be orthogonal so the sensed servo pattern of one frequency is zero when detected with the detecting circuitry for the other frequency. Because of the orthogonality and simultaneous detection, and through using PES signal stitching techniques, one of the quadrature servo pattern bursts that otherwise would be present (such as the D bursts) can be eliminated from the pattern, thereby reducing the disk surface area needed for the pattern by 25%. The disk surface area between servo bursts, the blank area, is preferably substantially less than one-half the total servo field area.

The circumferential length of the two-frequency, tri-burst servo pattern of FIG. 9 with A, B, and C bursts is preferably 25% shorter than conventional quad burst servo patterns that would include servo bursts corresponding to A, B, C, and D bursts. In this way, the FIG. 9 servo pattern can be recorded on a disk using fewer servo bursts, which take up less disk space.

DEMODULATION OF THE SECOND TWO-FREQUENCY, TRI-BURST SERVO PATTERN OF THE INVENTION

Figure 10:
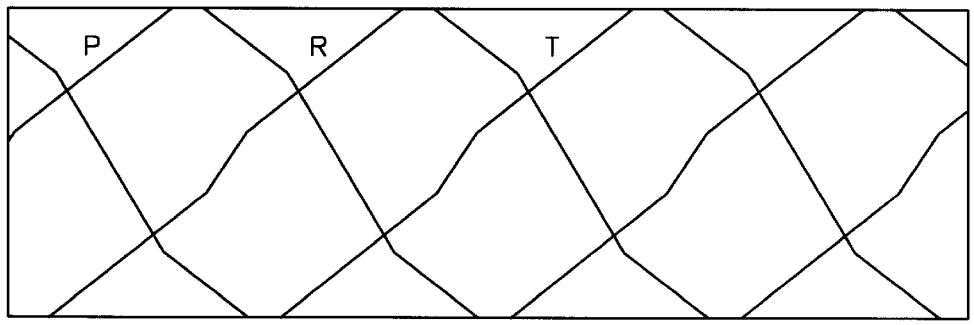
FIG. 10 is a representation of the R, T, and P components of the PES signal produced by the servo pattern illustrated in FIG. 9.
Figure 11:
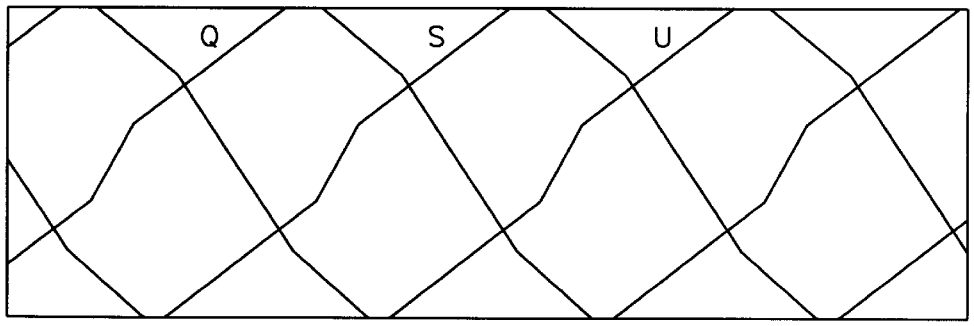
FIG. 11 is a representation of the Q, S, and U components of the PES signal produced by the servo pattern illustrated in FIG. 9.

FIG. 10 and FIG. 11 are graphs of the corresponding readback signals produced by a read/write head for a given track position as it transduces the FIG. 5 servo pattern. It should be apparent that servo track centers are defined by two bursts of the same frequency. FIG. 10 represents the f1 burst signals and FIG. 11 represents the f2 burst signals. The signals represented by the FIG. 10 and FIG. 11 graphs are combined to produce a position error sensing (PES) signal in a signal demodulation process. As with the prior embodiment, the PES signal components are given by the following equations:

$$P = A1 - B1$$

$$R = B1 - C1$$

$$T = C1 - A1$$

$$S = A2 - B2$$

$$Q = C2 - A2$$

$$U = B2 - C2$$

These demodulation relationships should be apparent from examination of FIG. 10 and FIG. 11, as was similarly the case for FIG. 6 and FIG. 7.

For example, if the read/write head is tracking exactly between the A1 servo burst and the B1 servo burst, then the P signal component should be at zero, because at this location the amount of A1 burst and B1 burst transduced and detected by the read/write head will be equal, and P=A1−B1. If the read/write head is moved toward the A1 burst, then the P signal component becomes more positive, because more of the A1 burst is sensed. If the read/write head is moved toward the B1 burst, then the P signal component becomes more negative, because more of the B1 burst is sensed. The P signal component reaches a peak value toward the center of the A1 burst when the B1 burst contribution is minimal, and decreases when the read/write head is moved to the left, away from the A1 burst, as less of the A1 burst is sensed. The P signal component levels off at zero when the contributions from the A1 burst and B1 burst are equal, then becomes negative moving toward the B1 burst. The other PES signal components can be analyzed in the same way. Thus, the PES signal component U is zero if the read/write head is tracking exactly between the B2 burst and the C2 burst, because at this location the amount of B2 burst and C2 burst sensed by the read/write head are equal and U=B2−C2.

As with the first embodiment, the PES signal component values of the second embodiment are normalized through division of the burst amplitude difference by the corresponding burst amplitude sum for the same frequency, to compensate for the typically different amplitude frequency response produced by the signal demodulation circuitry for the two different frequencies of the servo pattern bursts. Thus, the PES signal components are specified by the amplitude burst difference divided by the burst amplitude sums, as given by the entries in Table 3:

TABLE 3

| Burst amplitude difference | Burst amplitude sum (normalization divisor) |
| --- | --- |
| A1-B1 | A1 + B1 |
| B1-C1 | B1 + C1 |
| C1-A1 | C1 + A1 |
| A2-B2 | A2 + B2 |
| C2-A2 | C2 + A2 |
| B2-C2 | B2 + C2 |

Thus, the PES signal component for A1−B1 is given by (A1−B1)/(A1+B1); the PES signal component for B1−C1 is given by (B1−C1)/(B1+C1), and so forth.

Figure 12:
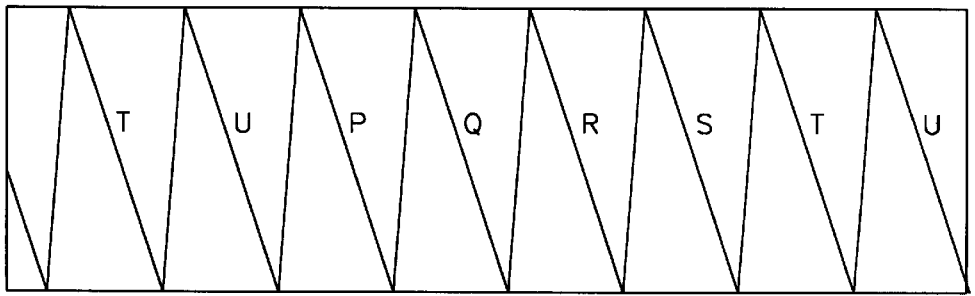
FIG. 12 is a representation of the stitched PES signal produced from the signal components shown in FIG. 10 and 11.

FIG. 12 is a graph of the stitched position error sensing (PES) signal produced from stitching of the P, R, T, S, Q, U signal components. Stitching of the PES signal components provides a stitched PES signal that is more linear in head movement response than a corresponding unstitched PES signal. In accordance with the invention, portions of the FIG. 10 and FIG. 11 graphs are combined to provide the FIG. 12 stitched PES signal according to the following relationships specified in Table 4:

TABLE 4

PES = P if $R \geq P$ and $Q \geq S$;
R if $T \geq R$ and $S \geq U$
T if $P \geq T$ and $U \geq Q$;
Q if $S \geq Q$ and $R \geq T$
S if $U \geq S$ and $T \geq P$
U if $Q \geq U$ and $P \geq R$.

The FIG. 12 stitched PES provides a more linear response to disk head movement from track to track. The FIG. 12 stitched PES provides a signal that quickly and accurately indicates the direction in which the read/write head must be moved to maintain position relatively centered above a track.

WRITING THE TWO-FREQUENCY, TRI-BURST SERVO PATTERN OF THE SECOND EMBODIMENT

As with the servo pattern of the first embodiment, the servo pattern of FIG. 9, constructed in accordance with the present invention, can be recorded on a disk with fewer servo writer steps, without trimming, making disk production more efficient.

In FIG. 9, the width "W" is the write head width, and each "W" line represents a servo writer step in recording the servo pattern. The write head width is shown as slightly less than three servo writer steps wide and approximately equal in width to a single servo pattern burst, slightly wider than the read head width R. It should be apparent that the FIG. 9 servo pattern bursts A1, B1, C1, A2, B2, C2 require three servo writer steps from track center to track center. The servo bursts preferably would be written in the same order as the first embodiment described above.

For example, at a first write step, a read/write head records the B2 servo burst in the vertical transducing direction. The read/write head is moved radially approximately one-third track to the left in FIG. 9 and, at the next rotation of the disk, the C1 servo burst is recorded. On the next disk rotation the read/write head is moved radially one-third track to the left and the A2 servo burst is recorded. Next, at approximately one-third servo track offset from the A2 servo burst, the B1 servo burst is recorded. The read/write head is moved another third-track to the left and on the next pass the C2 servo burst is recorded. The A1 servo burst is recorded one-third track further to the left, and the process repeats. Thus, from track center to track center, three servo writer steps are required. It should be apparent that there is even less empty or blank space in the FIG. 9 pattern as compared to the FIG. 5 pattern, and it should be apparent that both of these patterns are more dense than conventional patterns, in which approximately one-half the servo area is blank.

It should be noted that the FIG. 9 pattern also provides seamless servo pattern recording because the write head width, as shown above, is equal in width to the servo pattern bursts.

DISK DRIVE SYSTEM

Figure 13:
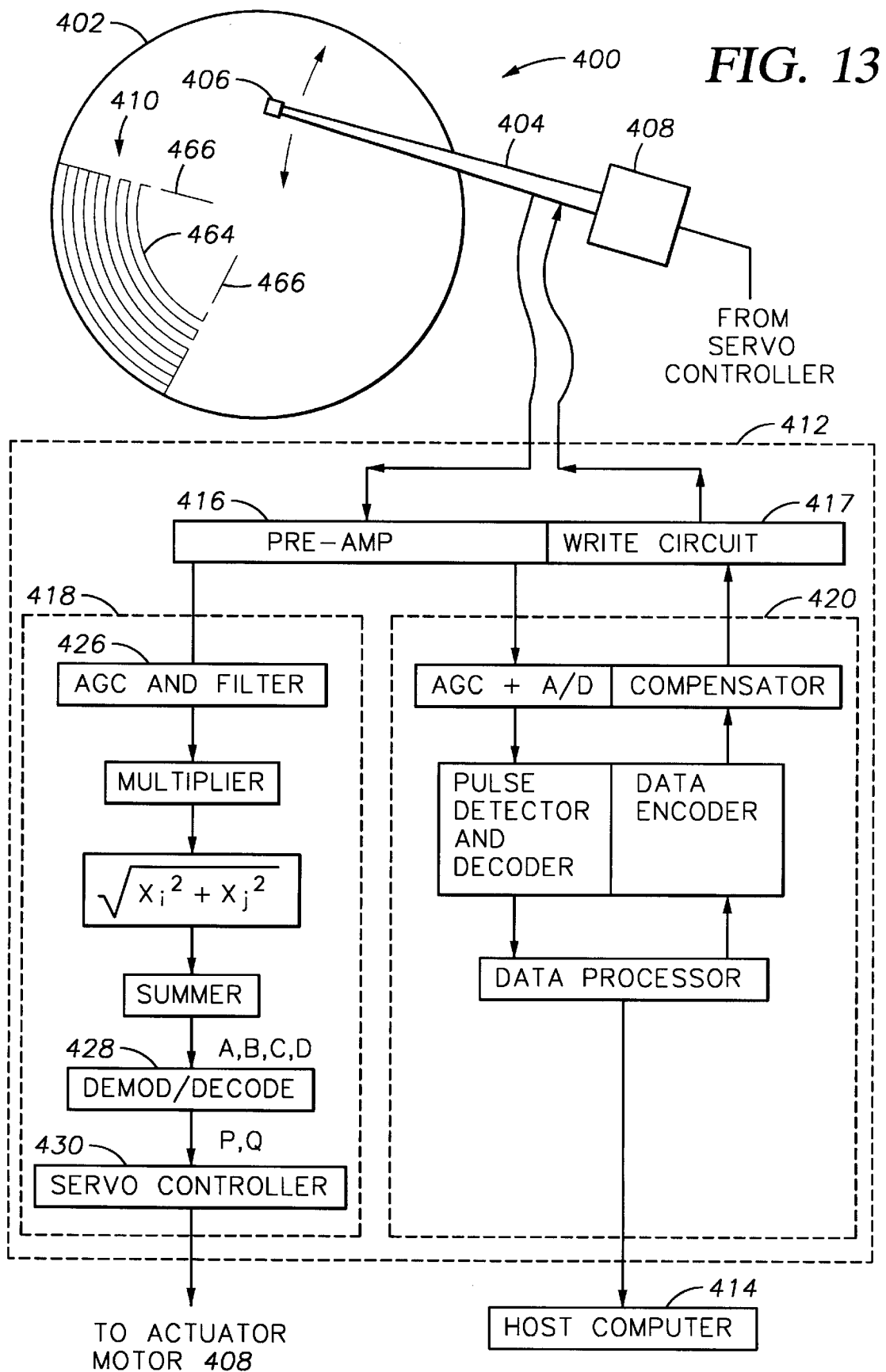
FIG. 13 is a representation of a disk drive system constructed in accordance with the present invention.

The two-frequency, tri-burst servo patterns of the type illustrated in FIG. 5 and FIG. 9 are implemented in conjunction with a magnetic disk drive 400, in an arrangement such as that depicted in FIG. 13. The disk drive 400 includes a storage media that may include one or more individual disks for storing magnetically encoded information. For case of explanation, however, only one disk 402 is illustrated in FIG. 13. The disk drive 400 also includes an actuator 404 with a read/write head 406. The position of the actuator 404 is changed by an actuator motor 408 under the control of a servo controller 434. The actuator motor 408 pivots the actuator, thereby changing the position of the read/write head 406 with respect to concentric tracks 410 of the disk 402. Although rotary movement of the actuator 404 is depicted for illustrative purposes, the disk drive 400 may alternatively use another positioning scheme, such as linear extension/retraction of the actuator 404.

The operation of the disk drive 400 is managed by a disk drive controller 412, which also serves as an interface between the disk drive 400 and a host computer 414. The host computer may comprise, for example, a desktop computer, a notebook computer, a mainframe computer, or another digital processing device for which storage of data on a disk is desired.

The controller 412 includes a readback signal pre-amplifier 416 ("pre-amp"), which receives electrical signal representations of recorded magnetic transitions sensed by the read/write head 406 from the disk 402. Because the disk 402 uses a sector servo positioning system, the pre-amp 416 serves a dual purpose by amplifying either data signals or servo signals, depending on whether the read/write head 406 is positioned over stored customer data or servo patterns, respectively. A write circuit is also provided to supply the read/write head 406 with data signals to be written to the disk 402. The write circuit is described in greater detail below. The readback signal processing will be described next.

Reading Customer Data from the Disk

The amplified signal from the pre-amp 416 is directed to two processing channels: a servo channel 418 and a customer data channel 420. When operating in conjunction with the data channel 420, the pre-amp 416 amplifies signals provided by the read/write head 406 that correspond to customer data stored on the disk 402. Amplified data signals from the pre-amp are then directed to a data channel automatic gain control, filter, and analog-to-digital converter (A/D) circuit 421. Then, a data pulse detector and decoder 422 forms digital data pulses corresponding to the analog signals provided by the circuit 421. Next, a pre-host data processor 423 converts the data pulses into formatted data strings that are specifically compatible with the host computer 414. The pre-host data processor 423 also performs decode and error correction control processing functions known to those skilled in the art.

Writing to the Disk

FIG. 13 shows the operation of the circuitry associated with the write function. In the preferred embodiment, the same hardware for writing customer data on the disk is used for writing the servo pattern bursts. In FIG. 13, there are no concentric lines 464 that designate tracks of the disk, which is divided into sectors that are represented by radial lines 466. The tracks can include several repeated cycles of a servo pattern and can encompass one or more tracks of customer data. Each sector includes a servo information field followed by a customer data identification field and a customer data field. After the servo pattern has been recorded and disk production is complete, a user can record and read customer data from the customer data field.

The host computer 414 generates customer data to be written into data tracks of the disk, or provides servo burst data for recording the servo pattern into the disk 402. The host computer information is received by the data processor 423 that converts the data into formatted data strings or, if necessary, uses a pattern generator or data encoder 424 to produce the appropriate servo burst data. A compensator 425 performs final signal processing prior to writing, and then the data is provided to the write circuit 417 that sees to it that the appropriate information is recorded.

Reading Servo Information

In contrast to the data channel 420 function to read customer data, the servo channel 418 functions to read servo information from the disk 402 to aid in properly positioning the read/write head 406 over the disk. When operating in conjunction lo with the servo channel 418, the pre-amp 416 amplifies servo signals produced when the read/write head 406 senses servo pattern bursts. The servo channel 418 includes a block 426 comprising an automatic gain control (AGC) filter and analog-to-digital converter (A/D) circuit, which may comprise any one of various known circuits for automatically adjusting the head readback signal gain and filtering it. The analog-to-digital converter block (A/D) converts the analog signal to a digital representation.

The amplified and converted head readback signal is then provided to a multiplier 428. The next operation performed is a sum of squares operation followed by a square root of the sum, represented by the multiplier box 430 in FIG. 13. This operation comprises the burst calculation referred to above. Next, in the summer 432, the terms are added together. Next, the data from the prior processing blocks is provided to a demodulator and decoder block (demod/decode) 434, which accumulates signal samples and processes the information to derive the position error sensing (PES) signal components. The PES signal is then used by a servo controller 436 to generate a position correction signal that, when provided to the actuator 404, controls the position of the read/write head 406. TIhe actuator motor 408 may, in an exemplary embodiment, comprise a voice coil motor.

PROCESSING THE SERVO INFORMATION

Figure 14:
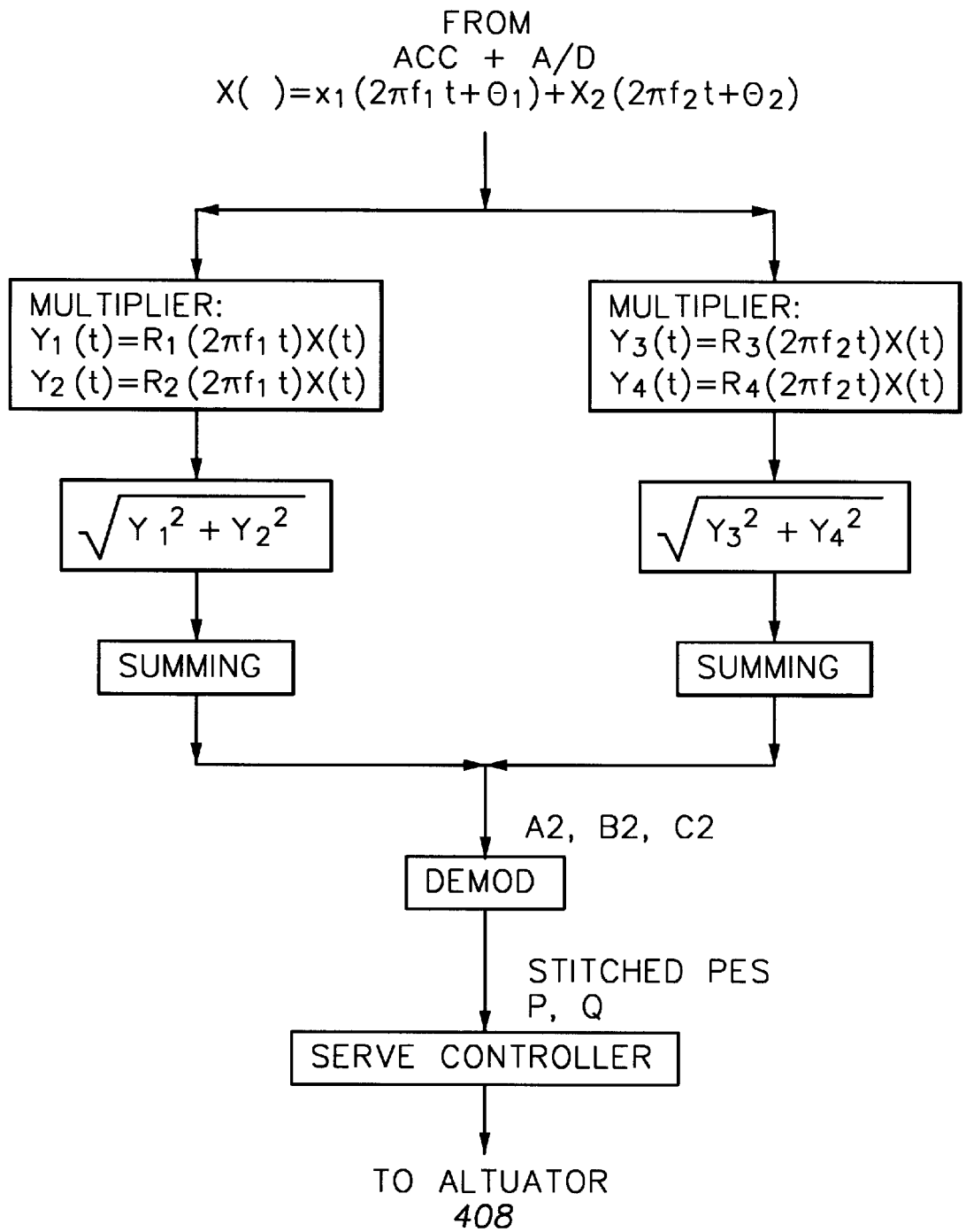
FIG. 14 is a block diagram representation of the data channel processing Performed by the servo control system of FIG. 13.

FIG. 14 shows some of the processing steps of the servo channel 418 (FIG. 13) in greater detail. In particular, FIG. 14 shows the processing from the gain adjusted data leaving the AGC and A/D block 426 of FIG. 13 to the beginning of servo controller processing 436.

First of all, the gain adjusted data values X(t) that comprise readback signal samples are specified by:

$$X(t)=x1(2\pi f1(t)+\theta 1)+x2(2\pi f2(t)+\theta 2)$$

where X(t) indicates a data value for a time domain readback signal sample value; x1 and x2 are readback signal sample signal values, one for each frequency component; f1(t) is the first frequency; f2(t) is the second frequency; and θ1 and θ2 are phase shift values.

Next, parallel processing steps are performed and different results are obtained depending on the frequency of the servo burst from which the "X" data sample was obtained. FIG. 14 shows that the multiplier 428 shown in FIG. 13 is comprised of a multiplier 428a for the first frequency f1 and a multiplier 428b for the second frequency f2. The operations performed by these respective multipliers is shown in FIG. 14 to be given by:

$$Y1(t)=R1(2\pi f1(t))X(t)$$

$$Y2(t)=R2(2\pi f2(t))X(t)$$

$$Y3(t)=R3(2\pi f3(t))X(t)$$

$$Y4(t)=R4(2\pi f4(t))X(t)$$

where Y1, Y2, Y3, Y4 are the respective intermediate operand outputs and the R1, R2, R3, R4 (as shown in FIG. 15) are predetermined coefficients depending on the servo burst frequencies f1 and f2. As noted above, the frequencies f1 and f2 are selected to be orthogonal, meaning that Y1 and Y2 will be zero for signal samples from the servo bursts recorded at the f2 frequency, whereas Y3 and Y4 will be zero for signal samples from the servo bursts recorded at the f1 frequency. Those skilled in the art will be able to select the frequencies f1, f2 and the predetermined coefficients R without further explanation, in view of the description herein.

The next processing block provides the square root of summed squares, again, with a separate block 430a, 430b for each frequency. In the summing block 432a, 432b, the sample values are summed to provide the stitched PES values.

Those skilled in the art will appreciate that the processing of FIG. 14 is illustrated graphically by the illustration of FIG. 15, which shows the function X(t) and two digital signals (R1 or R2, R3 or R4) below X. The X(t) function is analogous to the readback signal samples received by the processing circuitry of the present invention and the resulting digital signals correspond to the servo burst amplitude values that are the output of the summing block 432.

ADVANTAGES OF THE INVENTION

The servo pattern of the present invention can be written to form one of three phase signals and provide a position error sensing (PES) signal with only three servo bursts A, B, and C. Therefore, what would otherwise be the D pattern bursts from a quadrature servo pattern can be eliminated from the servo pattern, reducing by 25% the disk surface area needed for the two-frequency, tri-burst servo pattern. In addition, the servo write error is reduced, due to the untrimmed servo write process used.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to disk storage systems and servo control systems generally. All modifications, variations, or equivalent arrangements that are within the scope of the attached claims should therefore be considered to be within the scope of the invention.

We claim:

1. A data storage media on which is recorded a servo pattern comprising magnetic transitions arranged in multiple tracks of a storage disk in a servo field, the servo pattern comprising:

(1) radially aligned transitions A1 and A2, transitions A1 recorded at a first frequency f1, and transitions A2 recorded at a second frequency f2;

(2) radially aligned transitions B1 and B2, transitions B1 recorded at the first frequency f1, and transitions B2 recorded at the second frequency f2; and (3) radially aligned transitions C1 and C2, transitions C1 recorded at the first frequency f1, and transitions C2 recorded at the second frequency f2;

wherein the transitions are located in servo tracks such that the A1, B1, and C1 transitions define respective servo bursts that are circumferentially offset from each other, and the A2, B2, and C2 transitions define respective servo bursts that are circumferentially offset from each other, whereby in-phase and quadrature signal components are formed and combined to produce a position error sensing (PES) signal.

2. A data storage media as defined in claim 1, wherein the servo field includes a blank area not containing servo bursts that is less than one-half the total area of the servo field.

3. A data storage media as defined in claim 1, wherein the radial distance from servo burst center to servo burst center of servo bursts in circumferentially offset locations is not greater than one-half of a servo track width.

4. A data storage media as defined in claim 3, wherein the center-to-center radial distance is approximately one-third of a servo track width.

5. A disk drive system comprising:

(a) a data storage media on which is recorded a servo pattern comprising magnetic transitions arranged in multiple tracks of a storage disk servo field;

(b) a head assembly having at least one read head for reading the servo pattern on the storage media and generating a head readback signal;

(c) a data channel that receives a head readback signal produced from a servo pattern having (1) radially aligned transitions defining a servo burst A1 and a servo burst A2, the sevro burst A1 being recorded at a first frequency f1 and the servo burst A2 being recorded at a second frequency f2, (2) radially aligned transitions defining a servo burst B1 and a servo burst B2, the servo burst B1 being recorded at the first frequency f1 and the servo burst B2 being recorded at the second frequency f2, and (3) radially aligned transitions defining a servo burst C1 and a servo burst C2, the servo burst C1 being recorded at the first frequency f1 and the servo burst C2 being recorded at the second frequency f2, wherein the servo pattern transitions are located such that A1, B1, and C1 servo bursts having the same frequency are offset from each other, and A2, B2, and C2 servo bursts having the same frequency are offset from each other, whereby in-phase and quadrature signal components are formed from the servo bursts and combined to produce a PES signal;

(d) a servo assembly that is activated to position the head assembly relative to the storage medium; and (e) a servo controller that receives the position error signal and controls the servo assembly in accordance with the position error signal to maintain the magnetic head centered relative to the servo track.

6. A disk drive system as defined in claim 5, wherein the servo field includes a blank area not containing servo bursts that is less than one-half the total area of the servo field.

7. A disk drive system as defined in claim 5, wherein the radial distance from servo burst center to servo burst center of servo bursts in circumferentially offset locations is not greater than one-half of a servo track width.

8. A disk drive system as defined in claim 7, wherein the center-to-center radial distance is approximately one-third of a servo track width.

9. A disk drive system as defined in claim 5, wherein the first frequency f1 and the second frequency f2 are orthogonal.

10. A servo control system that positions a magnetic head adjacent a surface of a moving magnetic storage medium, the servo control system comprising:

(a) a servo signal detection channel that receives a readback signal from the magnetic head, the readback signal being produced from a servo pattern recorded in a servo field of the magnetic storage medium, the servo pattern having (1) radially aligned transitions A1 and A2, transitions, A1 recorded at a first frequency f1 and transitions A2 recorded at a second frequency f2, (2) radially aligned transitions B1 and B2, transitions B1 recorded at the first frequency f1 and transitions B2 recorded at the second frequency f2, and (3) radially aligned transitions C1 and C2, transitions C1 recorded at the first frequency f1 and transitions C2 recorded at the second frequency f2, located such that transitions A1, B 1, and C1 define respective servo bursts having the same frequency deing offset from each other, and transitiiso A2, B2, and C2 define respective servo bursts having the same frequency and being offset from each other, wherein in-phase and quadrature signal components are formed from the servo bursts and combined to produce a PES signal;

(b) a servo assembly that is activated to position the head assembly relative to the storage medium; and (c) a servo controller that receives the position error signal and controls the servo assembly in accordance with the position error signal to maintain the magnetic head centered relative to the servo track width.

11. A servo control system as defined in claim 10, wherein the servo field includes a blank area not containing servo bursts that is less than one-half the total area of the servo field.

12. A servo control system as defined in claim 10, wherein the radial distance from servo burst center to servo burst center of servo bursts in circumferentially offset locations is not greater than one-half of a servo track width.

13. A servo control system as defined in claim 12, wherein the center-to-center radial distance is approximately one-third of a servo track width.

14. A servo control system as defined in claim 12, wherein the first frequency f1 and the second frequency f2 are orthogonal.

15. A method of producing a data storage medium having a servo pattern recorded in circumferentially spaced apart servo tracks of a servo field area of the data storage medium, the method comprising the steps of:

(1) recording an A1 servo burst with a magnetic write head, the A1 servo burst comprising magnetic transitions recorded at a first frequency f1 in a first track;

(2) moving the write head radially a servo writer distance from the first track and recording a B2 servo burst comprising magnetic transitions recorded at a second frequency f2 different from the frequency f1;

(3) moving the write head radially an additional servo writer distance away from the first track and recording a C1 servo burst comprising magnetic transitions recorded at the first frequency f1;

(4) moving the write head radially an additional servo writer distance away from the first track and recording an A2 servo burst comprising magnetic transitions recorded at the second frequency f2;

(5) moving the write head radially an additional servo writer distance away from it the first track and recording a B1 servo burst comprising magnetic transitions recorded at the first frequency f1;

(6) moving the write head radially an additional servo writer distance away from the first track and recording a C2 servo burst comprising magnetic transitions recorded at the second frequency f2; and repeating the steps (1) through (6) across the servo field, thereby defining a servo pattern in the servo field having A1, B1, C1, A2, B2, and C2 servo bursts, wherein a position error sensing (PES) signal can be derived from the servo pattern by combining a readback signal transduced from the servo pattern bursts.

16. A method as defined in claim 15, wherein the servo field resulting after completion of the steps includes a blank area not containing servo bursts that is less than one-half the total area of the servo field.

17. A method as defined in claim 15, wherein the radial distance from a servo burst center to a servo burst center of servo bursts in circumferentially offset locations is not greater than one-half of a servo track width.

18. A method as defined in claim 17, wherein the center-to-center radial distance is approximately one-third of a servo track width.

19. A method as defined in claim 15, wherein the first frequency f1 and the second frequency f2 are orthogonal.

20. A method as defined in claim 15, wherein the servo writer distance is approximately one-half of a servo track width.

21. A method as defined in claim 15, wherein the servo writer distance is approximately one-third of a servo track width.

* * * * *